(12) United States Patent
Dill (10) Patent No.: US 9,829,124 B2
(45) Date of Patent: Nov. 28, 2017

(54) DOUBLE WALL TUBE ASSEMBLIES

(71) Applicant: UNITED TECHNOLOGIES CORPORATION, Farmington, CT (US)

(72) Inventor: Steven Dill, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 163 days.

(21) Appl. No.: 14/619,224

(22) Filed: Feb. 11, 2015

(65) Prior Publication Data

US 2015/0369400 A1    Dec. 24, 2015

Related U.S. Application Data

(60) Provisional application No. 62/013,755, filed on Jun. 18, 2014.

(51) Int. Cl.

| | |
|---|---|
| *F16L 9/19* | (2006.01) |
| *F16L 9/18* | (2006.01) |
| *F16L 23/16* | (2006.01) |
| *F16L 39/00* | (2006.01) |
| *F16L 43/00* | (2006.01) |
| *G01M 3/04* | (2006.01) |

(52) U.S. Cl.
CPC .................. *F16L 9/20* (2013.01); *F16L 9/18* (2013.01); *F16L 23/167* (2013.01); *F16L 39/005* (2013.01); *F16L 43/001* (2013.01); *G01M 3/04* (2013.01); *F16L 2201/30* (2013.01); *Y10T 29/49828* (2015.01)

(58) Field of Classification Search
CPC ... F16L 9/18; F16L 9/20; F16L 39/005; F16L 39/00; F16L 39/02; F16L 43/001; F16L 23/16; F16L 23/162; F16L 23/167; F16L 23/12; F16L 2201/30; G01M 3/04; F02C 7/222
See application file for complete search history.

(56) References Cited

U.S. PATENT DOCUMENTS

| | | | | |
|---|---|---|---|---|
| 2,695,182 | A * | 11/1954 | Folz .......................... | F16L 9/18 285/123.1 |
| 3,317,221 | A * | 5/1967 | Brown .................. | F16L 39/005 285/124.1 |
| 3,970,335 | A * | 7/1976 | Curington ................. | E21B 4/00 285/123.3 |

(Continued)

FOREIGN PATENT DOCUMENTS

WO    2013086191 A1    6/2013

OTHER PUBLICATIONS

European Search Report for Application No. 15 17 1503 dated Nov. 5, 2015.

*Primary Examiner* — J. Casimer Jacyna
(74) *Attorney, Agent, or Firm* — Cantor Colburn LLP (57) ABSTRACT

A double wall tube assembly includes an inner tube extending in an axial direction between two opposed ends of the inner tube. A sleeve fitting is mounted to one end of the inner tube. An outer tube outboard of the inner tube extends in the axial direction between two opposed ends of the outer tube. A collar fitting is mounted to one end of the outer tube wherein the collar fitting is outboard of the sleeve fitting.

10 Claims, 6 Drawing Sheets

(56) References Cited

U.S. PATENT DOCUMENTS

| | | | | |
|---|---|---|---|---|
| 4,067,596 A | * | 1/1978 | Kellner | E21B 17/042 |
| | | | | 175/215 |
| 4,723,441 A | | 2/1988 | Sweeney | |
| 5,611,373 A | * | 3/1997 | Ashcraft | F16L 9/18 |
| | | | | 138/113 |
| 6,231,086 B1 | * | 5/2001 | Tierling | F16L 9/18 |
| | | | | 285/123.1 |
| 6,520,213 B1 | * | 2/2003 | Esser | B65G 53/523 |
| | | | | 138/109 |
| 2001/0012476 A1 | * | 8/2001 | Louis | F16L 9/18 |
| | | | | 405/168.2 |
| 2006/0108791 A1 | * | 5/2006 | Chen | F16L 9/18 |
| | | | | 285/123.3 |
| 2007/0246117 A1 | * | 10/2007 | Naganawa | B21C 37/151 |
| | | | | 138/108 |
| 2009/0145506 A1 | * | 6/2009 | Queau | F16L 39/005 |
| | | | | 138/112 |
| 2010/0018599 A1 | | 1/2010 | Ferrer | |
| 2013/0000747 A1 | | 1/2013 | Buresi | |
| 2013/0087238 A1 | * | 4/2013 | Mercier | F16L 3/26 |
| | | | | 138/118.1 |
| 2013/0160886 A1 | | 6/2013 | Wright, Jr. | |
| 2013/0181439 A1 | * | 7/2013 | Alhaug | E21B 17/042 |
| | | | | 285/123.12 |

* cited by examiner

DOUBLE WALL TUBE ASSEMBLIES

CROSS-REFERENCE TO RELATED APPLICATION

This application claims the benefit of priority under 35 U.S.C. §119(e) to U.S. Provisional Application No. 62/013,755, filed Jun. 18, 2014, which is incorporated herein by reference in its entirety.

BACKGROUND OF THE INVENTION

1. Field of the Invention

The present disclosure relates to tube assemblies, and more particularly to tube assemblies with double walls, e.g., for redundancy in aerospace applications.

2. Description of Related Art

Tubing and conduits of various types can be used to route fluids throughout an engine, for example. In certain applications, redundancy is desirable. For example, in aerospace applications where engine fluids such as fuel and oil are conveyed through tubing, it is desirable to have redundancies in case of leakage from the tubing. One way of providing such a redundancy is to use double walled tubing, wherein an outer passage is formed between an inner tube and an outer tube. The main flow passes through the inside of the inner tube, and leakage, if any, can be captured in the outer passage between the inner and outer tubes. This can be used to prevent accumulation of engine fluids in unintended portions of the engine, for example.

Such conventional methods and systems have generally been considered satisfactory for their intended purpose. However, there is still a need in the art for improved double wall tube assemblies. The present disclosure provides a solution for this need.

SUMMARY OF THE INVENTION

A double wall tube assembly includes an inner tube extending in an axial direction between two opposed ends of the inner tube. A sleeve fitting is mounted to one end of the inner tube. An outer tube outboard of the inner tube extends in the axial direction between two opposed ends of the outer tube. A collar fitting is mounted to one end of the outer tube wherein the collar fitting is outboard of the sleeve fitting.

In certain embodiments, the axial direction follows a bend radius, wherein the inner and outer tubes each follow the bend radius. The inner tube can be longer in an axial direction than the outer tube. The collar fitting can be longer in the axial direction than the sleeve fitting. A coupling, e.g., a double seal coupling, can be mounted to the inner tube at an end opposite the sleeve fitting and to the outer tube at an end opposite the collar fitting.

In certain embodiments, a second sleeve fitting is mounted to an end of the inner tube opposite the first sleeve fitting and a second collar fitting is mounted to an end of the outer tube opposite the first collar fitting. Each of the first and second collar fittings can include an axial end face defining a respective seat with a respective one of the first and second sleeve fittings seated in the respective seat to suspend the inner tube inside the outer tube. The sleeve inserts can be welded to the inner tube. The collar inserts can be butt welded and/or brazed to the outer tube.

The sleeve insert can define a central bore therethrough for fluid communication through the sleeve fitting and inner tube, and the sleeve insert can define at least one peripheral passage outboard of the central bore for fluid communication through the sleeve fitting and a passage defined between the inner and outer tubes. For example, the at least one peripheral passage can define one or more axial bores through a radially extending flange of the sleeve fitting. It is also contemplated that the at least one peripheral passage can define a perimeter recess in a radially extending flange of the sleeve fitting.

In another aspect, a second inner tube can have a second sleeve fitting mounted to an end thereof, and a second outer tube outboard of the second inner tube can have a collar fitting mounted to an end of the second outer tube outboard of the second sleeve fitting. A seal assembly can sealingly engage between the first and second collar fittings and between the first and second sleeve fittings, e.g., wherein the seal assembly is sealingly engaged with the collar and sleeve fittings with axial seals.

A method of assembling a double wall tube assembly includes mounting a first sleeve fitting to an end of an inner tube, positioning an outer tube and a pair of opposed collar fittings about the inner tube, and mounting a second sleeve fitting to an end of the inner tube opposite the first sleeve fitting. The method also includes mounting a first one of the collar fittings to an end of the outer tube and mounting a second one of the collar fittings to an end of the outer tube opposite the first collar fitting. The method can include bending the inner and outer tubes to have a common bend radius prior to positioning the outer tube about the inner tube.

In certain embodiments, mounting the second collar fitting includes seating the first and second sleeve fittings against the first and second collar fittings, respectively. Seating the first and second sleeve fittings can include suspending the inner tube with a passage defined between the inner tube and the outer tube. Mounting the sleeve fittings can include butt welding each sleeve fitting to the inner tube. Mounting the collar fittings to the outer tube can include brazing and/or butt welding the collar fittings to the outer tube. Positioning the outer tube and collar fittings about the inner tube can include sliding the collar fittings over the outer tube and positioning the outer tube proximate the first sleeve fitting to clear an end area of the inner tube for orbit welding the second sleeve fitting to the inner tube.

Another exemplary embodiment of a method of assembly a double wall tube assembly includes mounting a first sleeve fitting to an end of an inner tube, positioning an outer tube and a collar fitting about of the inner tube, mounting a coupling to an end of the inner tube opposite the first sleeve fitting, mounting an end of the outer tube to the coupling, and mounting the collar fitting to an end of the outer tube opposite the coupling.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
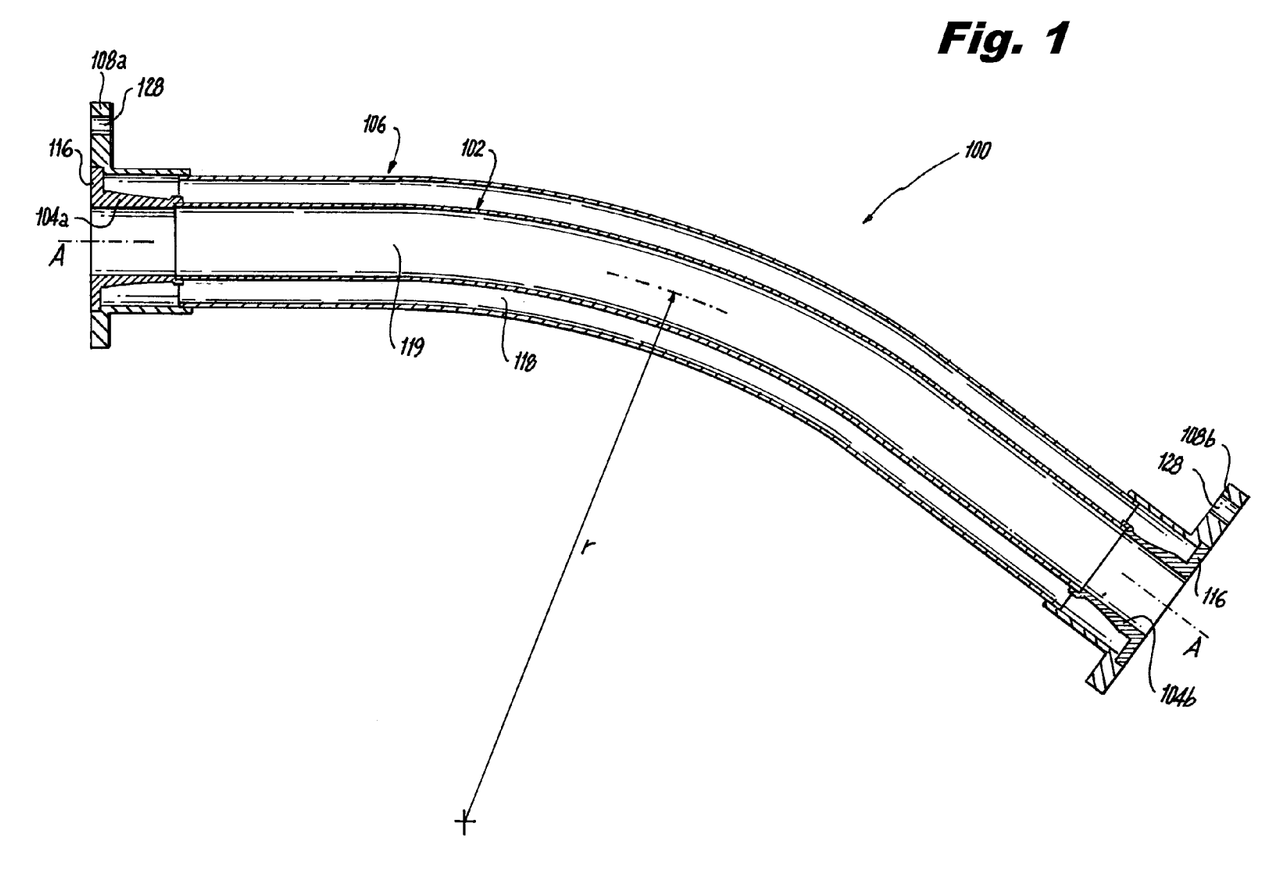
FIG. 1 is a cross-sectional side elevation view of an exemplary embodiment of a double wall tube assembly constructed in accordance with the present disclosure, showing the inner and outer tubes.

Reference will now be made to the drawings wherein like reference numerals identify similar structural features or aspects of the subject disclosure. For purposes of explanation and illustration, and not limitation, a partial view of an exemplary embodiment of a double wall tube assembly in accordance with the disclosure is shown in FIG. 1 and is designated generally by reference character 100. Other embodiments of double wall tube assemblies in accordance with the disclosure, or aspects thereof, are provided in FIGS. 2-12, as will be described. The systems and methods described herein can be used to provide redundancy, for example for conducting engine fluids through engines in aerospace applications. Another potential use is for co-axial flow, e.g., in a heat exchanger.

Double wall tube assembly 100 includes an inner tube 102 extending in an axial direction between two opposed ends of the inner tube 102, i.e., inner tube 102 extends along the curved axis A. The axial direction follows a bend radius r. A sleeve fitting 104a is mounted to one end of inner tube 102. An outer tube 106 outboard of inner tube 102 extends in the axial direction between two opposed ends of outer tube 106, i.e., the inner and outer tubes 102 and 106 each follow the bend radius r. A collar fitting 108a is mounted to one end of outer tube 106 wherein collar fitting 108a is outboard of sleeve fitting 104a.

A second sleeve fitting 104b is mounted to an end of the inner tube 102 opposite the first sleeve fitting 104a. A second collar fitting 108b is mounted to an end of outer tube 106 opposite the first collar fitting 108a. Inner tube 102 is longer in the axial direction than outer tube 106. The collar fittings 108a and 108b are longer in the axial direction than the sleeve fittings 104a and 104b.

Figure 2:
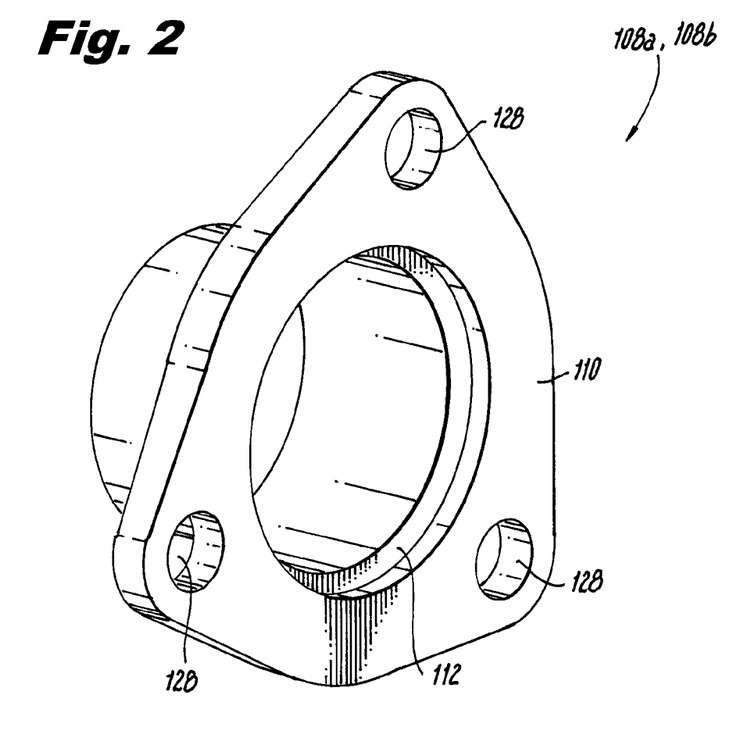
FIG. 2 is a perspective view of a portion of the double wall tube assembly of FIG. 1, showing one of the collar fittings.

With reference now to FIG. 2, each of the first and second collar fittings 108a and 108b can include an axial end face 110 defining a respective seat 112. As shown in FIG. 1, a respective one of the first and second sleeve fittings 104a and 104b is seated in the seat 112 of each respective collar fitting 108a and 108b to suspend inner tube 102 inside outer tube 106.

Figure 3:
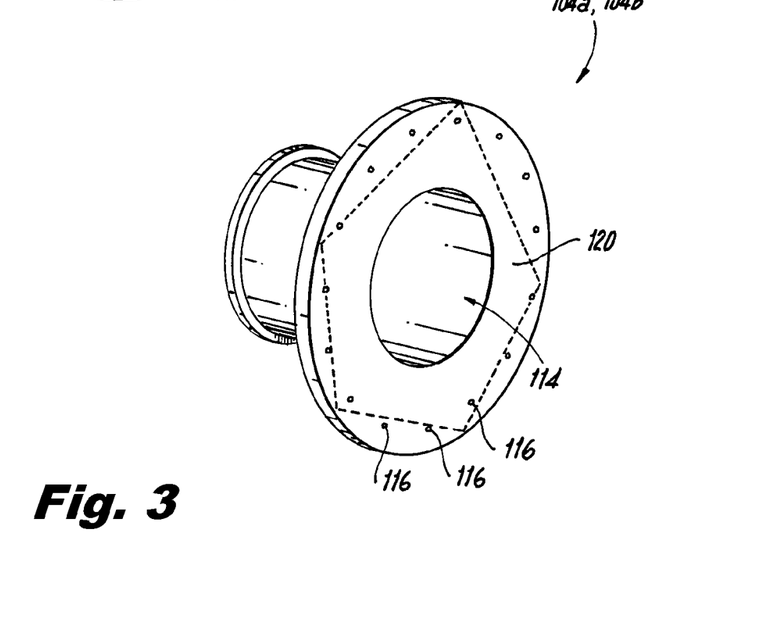
FIG. 3 is a perspective view of a portion of the double wall tube assembly of FIG. 1, showing one of the sleeve fittings.

Referring now to FIG. 3, each sleeve insert 104a and 104b can define a central bore 114 therethrough for fluid communication through sleeve fittings 104a and 104b and inner tube 102. Each sleeve insert 104a and 104b also defines at least one peripheral passage 116 (only some of which are identified in FIG. 3 with reference characters for sake of clarity) outboard of central bore 114 for fluid communication through sleeve fittings 104a and 104b and a passage 118 defined between the inner and outer tubes 102 and 106, as shown in FIG. 1, as described further below with reference to FIG. 7. In the example shown in FIG. 3, the peripheral passages 116 define axial bores through a radially extending flange 120 of each sleeve fitting 104a and 104b. It is also contemplated that the at least one peripheral passage 216 can define a perimeter recess such as the spaces between castellations 217 in a radially extending flange 220 in the exemplary embodiment of a sleeve fitting 204 shown in FIG. 6. It is also contemplated that any other suitable type of perimeter recess can be used, such as by making flange 220 have a polygonal periphery such as a pentagon, as indicated by the dashed lines in FIG. 3. In this case, the edges between the points of the pentagon provide peripheral passages.

Figure 4:
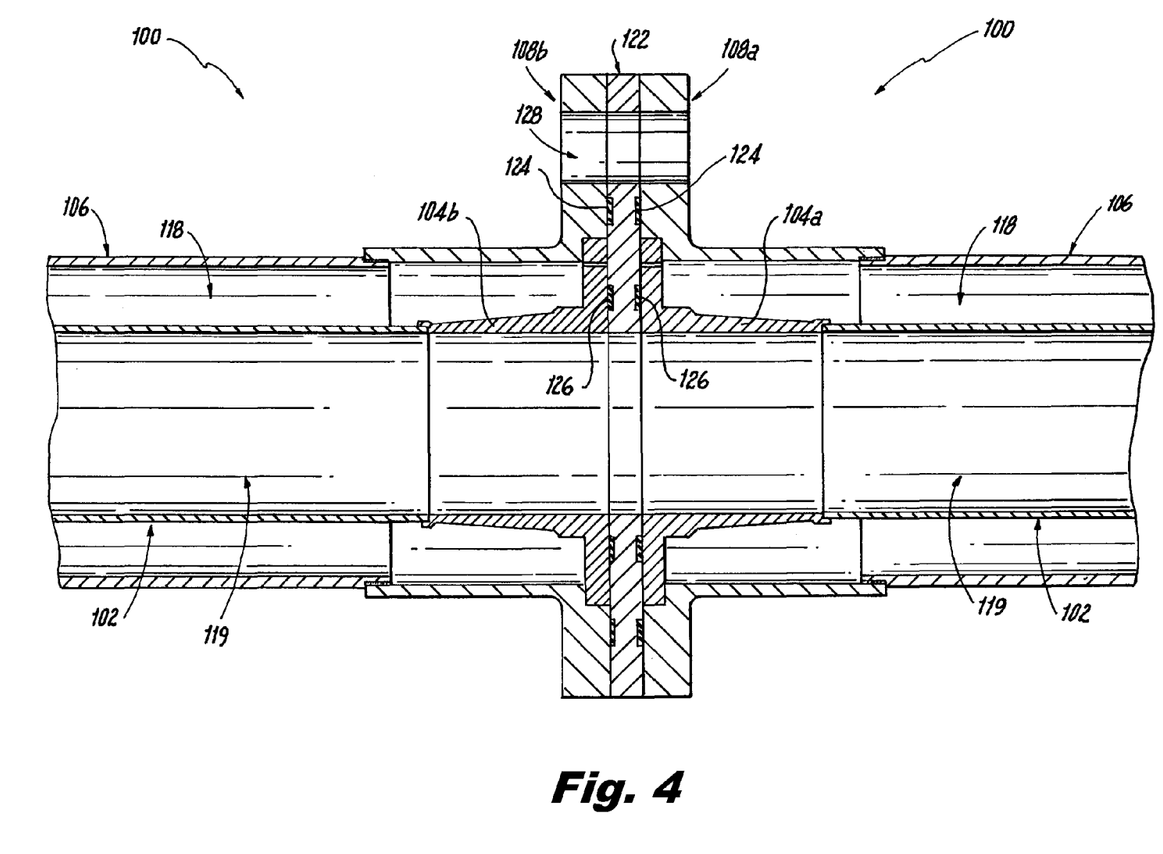
FIG. 4 is a cross-sectional side elevation view of the double wall tube assembly of FIG. 1, showing two such tube assemblies joined together.

With reference now to FIG. 4, a junction of two tube assemblies 100 is described. In FIG. 4, on the left is shown one end of a tube assembly 100 as described above, with the end having sleeve fitting 104b and collar fitting 108b shown. On the right in FIG. 4 is shown a second tube assembly 100 as described above, with the end having collar fitting 108a and sleeve fitting 104a shown. A seal assembly 122 sealingly engages between the collar fittings 108a and 108b with axial seals 124, which are axially compressed o-rings. Those skilled in the art will appreciate that any other type of seal can be used in addition to or in lieu of o-rings, such as a vulcanized seal. Seal assembly 122 also sealingly engages between the first and second sleeve fittings 104a and 104b with axial seals 126, which are axially compressed o-rings. This sealing arrangement allows for fluid isolation of flows through the junction of the two tube assemblies between the inner passage 119 of the inner tubes 102 and the outer passage 118. The two tube assemblies can be bolted together with a bolt passing through bores 128 formed through the collar fittings 108a and 108b and through seal assembly 122. Only one of three bores 128 is shown in FIG. 4, but see FIGS. 2 and 5, where all three bores are shown in the collar fittings 108a and 108b and in seal assembly 122. While shown as circular, it is also contemplated that bores 128 can be elongated circumferentially around axis A, i.e., kidney bean shaped, for example to accommodate cumulative mismatches in configurations with multiple tube assemblies 100 attached end to end. Simply removing the three flange bolts frees the double walled coupling allowing the tube assemblies 100 to be removed.

Figure 5:
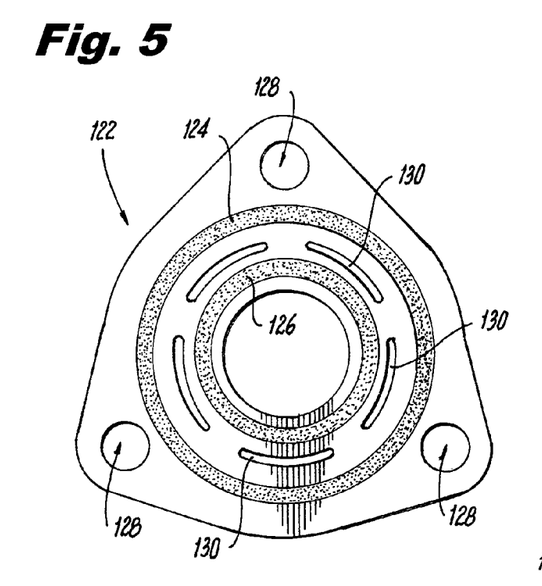
FIG. 5 is an end elevation view of a seal assembly for sealing the two double wall assemblies of FIG. 2 together, showing the axial seals on one side of the seal assembly.
Figure 6:
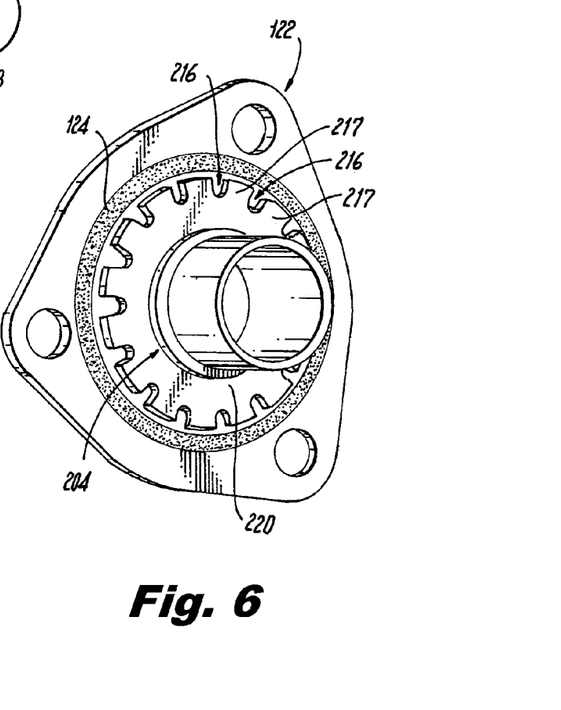
FIG. 6 is a perspective view of the seal assembly of FIG. 5, showing the seal assembly together with another exemplary embodiment of a sleeve fitting.
Figure 7:
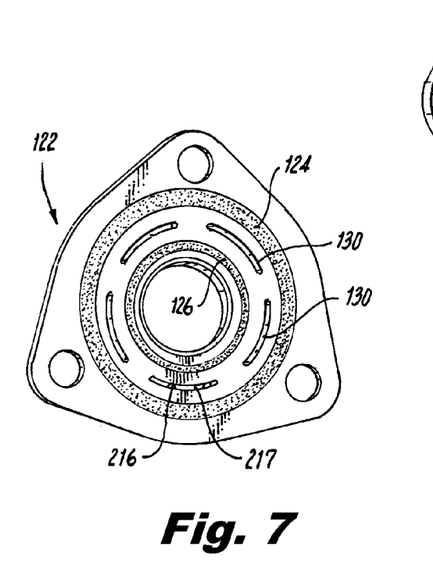
FIG. 7 is a perspective view of the seal assembly and sleeve fitting of FIG. 6 viewed from a side generally opposite that shown in FIG. 6, showing the passages defined through the seal assembly and sleeve fitting.

With reference now to FIG. 5, seal assembly 122 includes five passages 130, although any other suitable number can be used, for passage of fluids between axial seals 124 and 126. In FIG. 6, seal assembly 122 is shown aligned with sleeve fitting 204. As shown in FIG. 7, the reverse side of seal assembly 122 is shown from that in FIG. 6, to show alignment of peripheral passages 216 and passages 130 to permit flow through the junction of two tube assemblies 100, wherein the main flow through the central passage is sealed off through the junction from flow through passages 130 for the outer passage 118 shown in FIG. 1. This can be used, for example, to collect fluid in outer passage 118 leaked from the main flow for conveyance to a drain or the like, without junctions such as that shown in FIG. 4 adding to the leakage.

Figure 8:
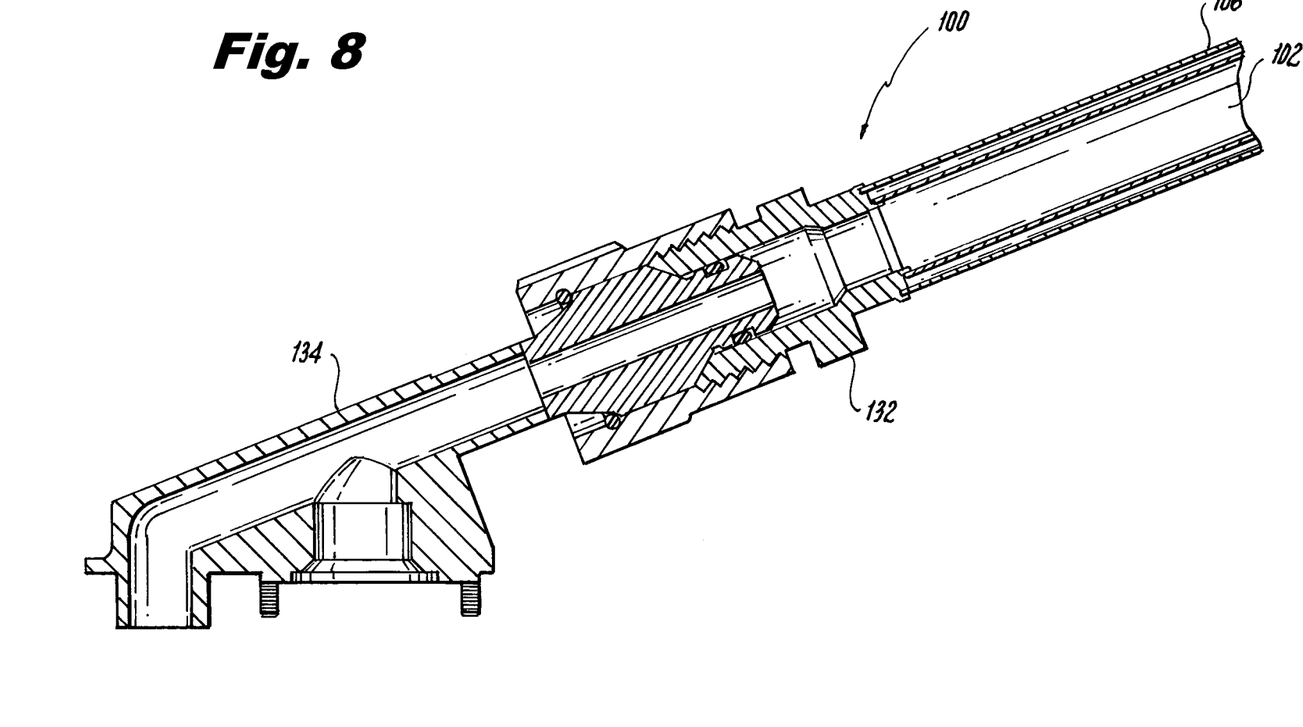
FIG. 8 is a cross-sectional elevation view of a portion of an exemplary embodiment of a double wall tube assembly, showing and end of the assembly mounted to a double seal coupling.

Referring to FIG. 8, it is contemplated that in lieu of collar and sleeve fittings, one end of tube assembly 100 can be mounted to a double sealed coupling 132 or other suitable interface to connect tube assembly 100, or a plurality of connected tube assemblies, to an engine component. Double sealed coupling 132 is exemplary, and can be any suitable fitting, e.g., a fitting that has co-axial weld ends that are offset axially to accommodate double wall tube. In the example shown in FIG. 8, tube assembly 100 is mounted to double sealed coupling 132, which is welded to one end of each of the inner and outer tubes 102 and 106. The opposite end of tube assembly, i.e., the end not shown in FIG. 8, can be mounted to sleeve and collar fittings 104b and 108b as described above for mounting to another tube assembly 100, e.g., as depicted in FIG. 4, for example. Double sealed coupling 132 provides an interface between tube assembly 100 and a fixture 134, which can provide fluid communication into an engine compartment, for example.

Figure 9:
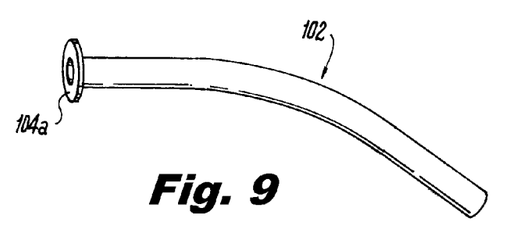
FIGS. 9-12 show exemplary stages of assembly in accordance with an embodiment of a method of assembling a double wall tube assembly in accordance with this disclosure.
Figure 10:
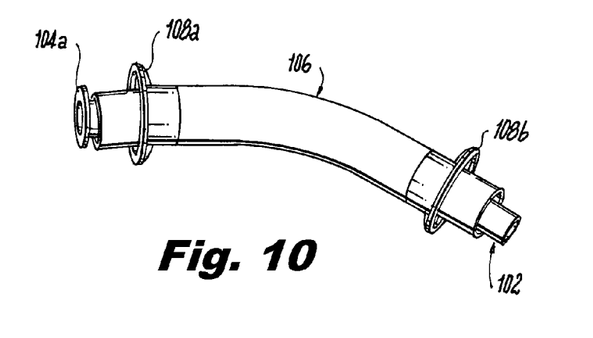

With reference now to FIGS. 9-12, an exemplary method of assembling tube assemblies such as tube assemblies 100 is described. As shown in FIG. 9, a first sleeve fitting 104a is mounted to an end of an inner tube 102, e.g., with a butt weld such as by orbital welding. An outer tube 106 and a pair of opposed collar fittings 108a and 108b are positioned about the inner tube 102 as shown in FIG. 10. Prior to positioning outer tube 106 about inner tube 102, both can be bent to have a common bend radius.

Figures 11, 12:
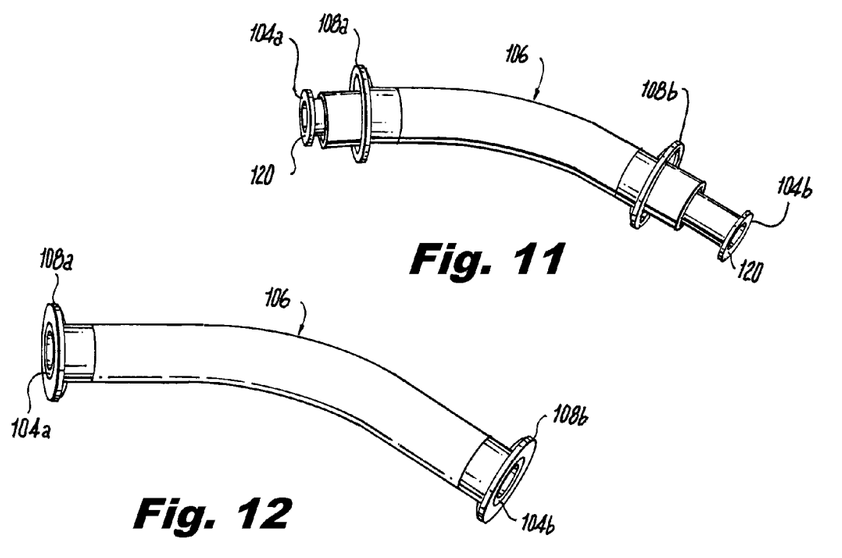

As indicated in FIG. 11, a second sleeve fitting 104b is mounted, e.g., by butt welding, to an end of the inner tube 102 opposite the first sleeve fitting 104a. The mounting of the sleeve fittings 104a and 104b can be inspected at this stage, e.g., the welds can be inspected using X-ray techniques. Positioning outer tube 106 and collar fittings 108a and 108b about inner tube 102 can include sliding the collar fittings 108a and 108b over outer tube 106 and positioning outer tube 106 proximate first sleeve fitting 104a to clear an end area of inner tube 102 for butt welding the second sleeve fitting 104b to the inner tube 102. To facilitate mounting sleeve fitting 104b to inner tube 102, the length of outer tube 106 is shorter than the distance between flanges 120 of the sleeve fittings 104a and 104b. The fact that collar fittings 108a and 108b are axially longer than sleeve fittings 104a and 104b be helps compensate for the difference in length between the inner and outer tubes 102 and 106. Outer tube 106 is shorter than inner tube 102, so by positioning outer tube 106 and collar fittings 108a and 108b away from sleeve fitting 104b, the joint area is accessible for welding or otherwise mounting sleeve fitting 104b to inner tube 102.

As indicated in FIG. 12, the method also includes mounting a first one of the collar fittings, e.g., collar fitting 108a, to an end of the outer tube 106 and mounting a second one of the collar fittings, e.g., collar fitting 108b, to an end of the outer tube 106 opposite the first collar fitting. The collar fittings 108a and 108b can be mounted using fillet welding, full penetration offset welding, brazing, or any other suitable process, and the joints can be visually inspected. Mounting the second collar fitting 108b can include seating the first and second sleeve fittings 104a and 104b against the first and second collar fittings 108a and 108b, respectively. This can suspend the inner tube 102 with a passage, e.g., passage 118 shown in FIG. 1, defined between inner tube 102 and outer tube 106.

In the exemplary embodiment shown in FIG. 8, the first sleeve fitting 104a can be mounted to an end of an inner tube 102. An outer tube 106 and a collar fitting 108a can be positioned about of inner tube 102. A coupling interface can be mounted to an end of the inner tube 102 opposite the first sleeve fitting 104a, and an end of the outer tube 106 can be mounted to the coupling interface as well. The collar fitting 108a can be mounted to an end of outer tube 108a opposite the coupling interface.

The methods and systems of the present disclosure, as described above and shown in the drawings, provide for double wall tube assemblies with superior properties including ease of manufacture and redundancy for preventing and/or reducing leakage. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A double wall tube assembly comprising:
   an inner tube extending in an axial direction between two opposed ends of the inner tube;
   a sleeve fitting mounted to one end of the inner tube;
   an outer tube outboard of the inner tube and extending in the axial direction between two opposed ends of the outer tube;
   a collar fitting mounted to one end of the outer tube wherein the collar fitting is outboard of the sleeve fitting, wherein the collar fitting includes an axial end face defining a seat, wherein the seat receives a radially extending flange of the sleeve fitting to suspend the inner tube inside the outer tube, and wherein the sleeve fitting defines a central bore therethrough for fluid communication through the sleeve fitting and inner tube, and wherein the sleeve fitting defines at least one peripheral passage outboard of the central bore for fluid communication through the sleeve fitting and a passage defined between the inner and outer tubes; and
   at least one axial seal engaging the radially extending flange of the sleeve fitting for sealing the central bore from the at least one peripheral passage.

2. An assembly as recited in claim 1, wherein the axial direction follows a bend radius, wherein the inner and outer tubes each follow the bend radius.

3. An assembly as recited in claim 1, wherein the inner tube is longer in an axial direction than the outer tube.

4. An assembly as recited in claim 1, wherein the collar fitting is longer in the axial direction than the sleeve fitting.

5. An assembly as recited in claim 1, wherein the sleeve fitting is a first sleeve fitting, wherein a second sleeve fitting is mounted to an end of the inner tube opposite the first sleeve fitting, wherein the collar fitting is a first collar fitting, and wherein a second collar fitting is mounted to an end of the outer tube opposite the first collar fitting.

6. An assembly as recited in claim 5, wherein the sleeve fittings are welded to the inner tube.

7. An assembly as recited in claim 5, wherein the collar fittings are butt welded and/or brazed to the outer tube.

8. An assembly as recited in claim 1, wherein the at least one peripheral passage defines a perimeter recess in a radially extending flange of the sleeve fitting.

9. An assembly as recited in claim 1, wherein the inner tube is a first inner tube, wherein the sleeve fitting is a first sleeve fitting, wherein the outer tube is a first outer tube, and wherein the collar fitting is a first collar fitting and further comprising:

a second inner tube with a second sleeve fitting mounted to an end thereof, with a second outer tube outboard of the second inner tube with a collar fitting mounted to an end of the second outer tube outboard of the second sleeve fitting.

10. An assembly as recited in claim 1, further comprising a coupling interface mounted to the inner tube at an end opposite the sleeve fitting and to the outer tube at an end opposite the collar fitting.

* * * * *